United States Patent
Kurihara et al.

(10) Patent No.: US 10,508,192 B2
(45) Date of Patent: Dec. 17, 2019

(54) THERMOPLASTIC RESIN COMPOSITION, MOLDED ARTICLE, AND MANUFACTURING METHOD OF MOLDED ARTICLE

(71) Applicant: CANON KABUSHIKI KAISHA, Tokyo (JP)

(72) Inventors: Daisuke Kurihara, Kawasaki (JP); Takahiro Kojima, Hiratsuka (JP); Kosuke Nishino, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 15/498,701

(22) Filed: Apr. 27, 2017

(65) Prior Publication Data
US 2017/0321035 A1    Nov. 9, 2017

(30) Foreign Application Priority Data

May 6, 2016 (JP) .................................. 2016-093456
Apr. 12, 2017 (JP) .................................. 2017-079089

(51) Int. Cl.
C08K 5/103 (2006.01)
C08K 3/00 (2018.01)
C08K 3/26 (2006.01)

(52) U.S. Cl.
CPC ................ C08K 5/103 (2013.01); C08K 3/26 (2013.01); *C08K 2003/265* (2013.01)

(58) Field of Classification Search
CPC .................................................... C08K 5/103
See application file for complete search history.

(56) References Cited

U.S. PATENT DOCUMENTS

| | | |
|---|---|---|
| 6,147,148 A | 11/2000 | Tanaka et al. |
| 6,576,695 B1 | 6/2003 | Tanaka et al. |
| 9,902,834 B2 | 2/2018 | Kolditz et al. |
| 2017/0032104 A1 | 11/2017 | Kojima et al. |

FOREIGN PATENT DOCUMENTS

| | | | |
|---|---|---|---|
| CN | 103333453 A | | 10/2013 |
| CN | 104379663 A | | 2/2015 |
| CN | 104530624 A | | 4/2015 |
| CN | 106009536 A | * | 10/2016 |
| EP | 0 908 491 A2 | | 4/1999 |
| JP | 11-199746 A | | 7/1999 |
| JP | 3770514 B2 | | 4/2006 |
| JP | 2008-069299 A | | 3/2008 |
| JP | 2010-059279 A | | 3/2010 |
| JP | 2013-032488 A | | 2/2013 |
| TW | I248951 B | | 2/2006 |
| WO | 2013/167230 A1 | | 11/2013 |

OTHER PUBLICATIONS

Machine translation of CN106009536. (Year: 2016).*
Machine translation of JPH11199746. (Year: 1999).*
Kojima et al., U.S. Appl. No. 15/581,277, filed Apr. 28, 2017.
Notice of Reason for Refusal in Japanese Application No. 2017-079089 (dated Oct. 30, 2018).
Database WPI Abstract for JP 2013-032488 (Feb. 14, 2013) (XP02774137).
Database WPI Abstract for JP 11-199746 (Jul. 27, 1999) (XP02774138).
Extended European Search Report in European Application No. 17000771.0 (dated Oct. 13, 2017).
First Office Action in Chinese Application No. 201710310030.6 (dated Aug. 2, 2019).
Wang Wenguang, "Plastic Formulation Design", p. 227, Chemical Industry Press (Sep. 2001).

* cited by examiner

*Primary Examiner* — Wenwen Cai

(74) *Attorney, Agent, or Firm* — Venable LLP

(57) ABSTRACT

In order to suppress such a situation that polyglyceryl fatty acid ester bleeds out at the time of melting of a thermoplastic resin while improving an impact resistance, a thermoplastic resin composition contains a high impact polystyrene, a calcium carbonate as a filler, and polyglyceryl fatty acid ester as a dispersing agent, and a fatty acid constructing the polyglyceryl fatty acid ester is an unsaturated fatty acid.

16 Claims, 1 Drawing Sheet

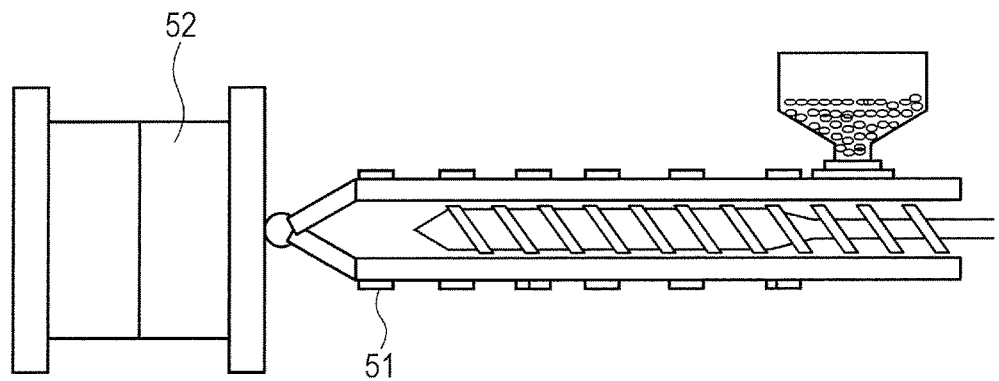

THERMOPLASTIC RESIN COMPOSITION, MOLDED ARTICLE, AND MANUFACTURING METHOD OF MOLDED ARTICLE

BACKGROUND OF THE INVENTION

Field of the Invention

The present invention relates to a thermoplastic resin composition containing a thermoplastic resin, a molded article, and a manufacturing method of the molded article.

Description of the Related Art

Molded articles which are obtained by using a thermoplastic resin and kneading-molding it are used in many fields such as bumper members of automobile parts, casings of electron/electric equipment, and the like. A method of mixing various kinds of inorganic fillers into those thermoplastic resins in order to improve a strength, a rigidity, an economy, and the like is widely used. However, if the filler is mixed into the thermoplastic resin, ordinarily, an impact resistance of an obtained resin composition deteriorates remarkably. As a first one of causes of the remarkable deterioration of the impact resistance, such a point that the filler which is mixed into the thermoplastic resin has been condensed and a dispersibility is insufficient can be mentioned. As a second one of the causes of the remarkable deterioration of the impact resistance, such a point that an adhesive property between a filler surface and the thermoplastic resin is low and the thermoplastic resin has been peeled off from the filler surface is considered.

Japanese Patent No. 3770514 proposes a thermoplastic resin composition containing a thermoplastic resin, a filler, and polyglyceryl fatty acid ester.

However, according to the technique disclosed in Japanese Patent No. 3770514, it is an object to improve a heat-resistant aging property and nothing is examined about an impact resistance of a molded article consisting of the thermoplastic resin composition and a bleed-out (exudation) of polyglyceryl fatty acid ester.

If an addition amount of the filler is increased in order to improve a strength, a rigidity, and an economy of the thermoplastic resin composition, that is, the molded article, the impact resistance (impact value) decreases. Therefore, in order to improve the impact resistance, it is necessary to add polyglyceryl fatty acid ester. However, if an addition amount of the polyglyceryl fatty acid ester is too small, an effect of the dispersibility of the filler cannot be obtained and an improvement effect of the impact resistance is low. It has been confirmed that if the addition amount of the polyglyceryl fatty acid ester is excessively increased in order to improve the impact resistance, when the thermoplastic resin is melt-molded, the polyglyceryl fatty acid ester bleeds out and a mold contamination is caused.

SUMMARY OF THE INVENTION

It is, therefore, a purpose of the present invention to suppress such a situation that polyglyceryl fatty acid ester bleeds out at the time of melting of a thermoplastic resin while improving an impact resistance.

According to an aspect of the present invention, a thermoplastic resin composition comprises: a thermoplastic resin; a filler; and polyglyceryl fatty acid ester, wherein the thermoplastic resin contains a component defined by a following formula (I), and a fatty acid constructing the polyglyceryl fatty acid ester is an unsaturated fatty acid.

$$-CH_2-CH=CH-CH_2- \quad (I)$$

According to the present invention, the impact resistance is improved and such a situation that polyglyceryl fatty acid ester bleeds out at the time of melting of a thermoplastic resin is suppressed.

Further features of the present invention will become apparent from the following description of exemplary embodiments with reference to the attached drawing.

BRIEF DESCRIPTION OF THE DRAWING

FIG. 1 is a diagram for describing a manufacturing method of a molded article according to an embodiment.

DESCRIPTION OF THE EMBODIMENTS

Preferred embodiments of the present invention will now be described in detail in accordance with the accompanying drawing.

A thermoplastic resin composition as a material of a molded article contains containing a thermoplastic resin (A), an inorganic filler (B) as a filler, and polyglyceryl fatty acid ester (C). The molded articles are applied as parts of OA equipment and other electric/electronic equipment or parts of attachments of electric/electronic equipment. The molded articles can be also applied to structural members of automobiles, airplanes, or the like, building members, feed containers, and the like. Details of the thermoplastic resin (A), inorganic filler (B), and polyglyceryl fatty acid ester (C) will be described hereinbelow.

[Thermoplastic Resin (A)]

The thermoplastic resin (A) is constructed in such a manner that a component defined by a chemical formula (I) including a double bond of carbon is granularly dispersed in a base resin having one kind or two or more kinds of thermoplastic properties.

$$-CH_2-CH=CH-CH_2- \quad (I)$$

With respect to the base resin, it is not particularly restricted so long as it has a thermoplastic property. For example, engineering plastics, super engineering plastics, and the like can be mentioned. A material containing one kind or two or more kinds of them may be used. As engineering plastics, a polyphenylene ether resin, a polyacetal resin, a polycarbonate resin, an aromatic polyester resin, a polyamide resin, a polyarylate resin, a polyethylene resin, a polypropylene resin, and a polystyrene resin can be mentioned. As a polyarylate resin, there are amorphous polyarylate and liquid crystalline polyarylate. As super engineering plastics, polyether ether ketone, polyether imide, polysulfone, polyether sulfone, and polypropylene sulfide can be mentioned. As a base resin, a polystyrene resin or a polycarbonate resin among them is desirable, and a polystyrene resin is more desirable.

As a thermoplastic resin (A) containing the component defined by the structural formula (I), polybutadiene, a styrene-butadiene rubber, an acrylonitrile-butadiene rubber, an acrylonitrile•butadiene•styrene (ABS) rubber, and the like can be mentioned, and one kind or two or more kinds of them are used. Polybutadiene or the ABS resin among them is desirable. Such a form that the thermoplastic resin (A) contains the component defined by the formula (I) is not particularly restricted and may be a blend body or a copolymer.

A high impact polystyrene (HIPS) is more desirable as a thermoplastic resin (A). A content percentage (content) of the component defined by the structural formula (I) to the whole thermoplastic resin (A) lies within a range between 2 wt % or more and 30 wt % or less as a weight ratio of a monomer, desirably, a range between 10 wt % or more and 30 wt % or less, and more desirably, a range between 15 wt % or more and 30 wt % or less.

It is desirable that a content percentage (content) of the thermoplastic resin (A) to the whole thermoplastic resin composition lies within a range between 40 wt % or more and 79.5 wt % or less. If the content is less than 40 wt %, the improvement effect of the impact resistance is low. If the content exceeds 79.5 wt %, the improvement effect of the strength, rigidity, and economy decreases. In order to further improve the impact resistance, it is more desirable that the content percentage of the thermoplastic resin (A) to the whole thermoplastic resin composition is set to a value within a range between 50 wt % or more and 79.5 wt % or less. In order to further improve the strength and rigidity, it is more desirable that the content percentage of the thermoplastic resin (A) to the whole thermoplastic resin composition is set to a value within a range between 50 wt % or more and 58.5 wt % or less, and further desirably, a range between 55 wt % or more and 58.5 wt % or less.

<High Impact Polystyrene (HIPS)>

The high impact polystyrene is, generally, such a resin that in order to improve the impact resistance of the polystyrene resin, a rubber-like elastic body is polymerized or dispersed into polystyrene (chemical formula (II)).

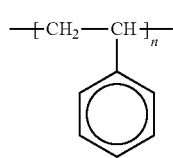

(II)

As for a rubber-like elastic body, although it is not particularly limited, for example, a butadiene rubber, a styrene butadiene rubber, an acrylic rubber, an acrylonitrile butadiene rubber, a natural rubber, and the like can be mentioned.

The high impact polystyrene is such a resin that the component defined by the structural formula (I) is contained in the rubber-like elastic body and, a butadiene rubber and a styrene butadiene rubber are desirable. As a high impact polystyrene, for example, NORYL Series made by Sabic Co., Ltd. or Dic Styrene HIPS Series made by DIC Co., Ltd. are available.

[Inorganic Filler (B)]

As for the inorganic filler (B), although it is not particularly limited, for example, various kinds of inorganic fillers in which the strength, rigidity, economy, and the like are improved can be used irrespective of a shape such as plate-like, fibrous form, granular, or the like. As specific examples of the inorganic filler (B), a metal oxide, a metal hydroxide, a carbonate, a sulfate, a silicate compound, a glass series filler, a silic acid compound, a ferrite class, graphite, and the like can be mentioned. As a metal oxide, alumina, a zinc oxide, a titanium oxide, a cerium oxide, a calcium oxide, a magnesium oxide, an iron oxide, a tin oxide, an antimony oxide, and the like can be mentioned. As a metal hydroxide, a calcium hydroxide, a magnesium hydroxide, an aluminum hydroxide, and the like can be mentioned. As a carbonate, a basic magnesium carbonate, a calcium carbonate, a magnesium carbonate, a zinc carbonate, a barium carbonate, dawsonite, hydrotalcite, and the like can be mentioned. As a sulfate, a calcium sulfate, a barium sulfate, a magnesium sulfate, a gypsum fiber, and the like can be mentioned. As a silicate compound, a calcium silicate (wollastonite, xonotlite, etc.), talc, clay, mica, montmorillonite, bentonite, activated clay, sepiolite, imogolite, sericite, kaoline, vermiculite, smectite, and the like can be mentioned. As a glass series filler, a glass fiber, a milled glass fiber, glass beads, glass flake, a glass balloon, and the like can be mentioned. As a silic acid compound, silica (white carbon, etc.), quartz sand, and the like can be mentioned.

The inorganic filler (B) contained in the thermoplastic resin composition may consist of one kind or two or more kinds of materials. A calcium carbonate and wollastonite are desirably used. Particularly, in the case of the calcium carbonate, a mechanical strength can be further raised and a high economy can be provided. Therefore, as an inorganic filler (B), the calcium carbonate is more desirable.

It is desirable that a content percentage (content) of the inorganic filler (B) to the whole thermoplastic resin composition lies within a range between 20 wt % or more and 50 wt % or less. If the content is less than 20 wt %, the improvement effect of the strength, rigidity, and economy is low. If the content exceeds 50 wt %, the improvement effect of the impact resistance decreases. Therefore, in order to further improve the impact resistance, strength, rigidity, and economy, it is more desirable that the content percentage of the inorganic filler (B) to the whole thermoplastic resin composition is set to a value within a range between 30 wt % or more and 40 wt % or less and it is further desirable to set the content percentage to 40 wt %.

<Calcium Carbonate>

As for the calcium carbonate, it is not particularly limited and a synthetic calcium carbonate (sedimentating calcium carbonate), a heavy calcium carbonate, and the like can be used. The synthetic calcium carbonate can be manufactured by, for example, reacting a calcium hydroxide and a carbon dioxide gas. The calcium hydroxide can be manufactured by, for example, reacting the calcium oxide and water. The calcium oxide can be manufactured by, for example, baking a limestone rough stone by a coke or the like. In this case, since a carbon dioxide gas is generated at the time of baking, by reacting the carbon dioxide gas to the calcium hydroxide, the calcium carbonate can be manufactured. The heavy calcium carbonate is obtained by a method whereby a calcium carbonate rough stone which is naturally produced is ground by a well-known method. As a method of grinding the calcium carbonate rough stone, a method of grinding it by a roller mill, a high speed tumbling mill (impact shearing mill), a container driving medium mill (ball mill), a medium stirring mill, a planetary ball mill, a jet mill, or the like. As for a mean particle diameter of the calcium carbonate, although it is not particularly limited, it is more desirable that it lies within a range of 0.01 to 30 μm. The mean particle diameter of the calcium carbonate can be measured by a laser diffraction type particle size distribution measuring apparatus. As a calcium carbonate, for example, NS#100 made by Nitto Funka Industries Co., Ltd, Vigot-15 made by Shiraishi Industries Co., Ltd, or the like can be obtained.

[Polyglyceryl Fatty Acid Ester (C)]

Polyglyceryl fatty acid ester is ester obtained by reacting polyglycerin and a fatty acid. The polyglyceryl fatty acid ester (C) is added into the thermoplastic resin (A), as a dispersing agent to disperse the inorganic filler (B). In the thermoplastic resin (A), by dispersing the inorganic filler (B), an impact resistance of the thermoplastic resin composition, that is, the molded article is improved.

A mean polymerization degree of polyglycerin as a constituting component of the polyglyceryl fatty acid ester (C) is not particularly limited so long as its effect is obtained. As specific examples of polyglycerin, diglycerin, triglycerin, tetraglycerin, pentaglycerin, hexaglycerin, heptaglycerin, octaglycerin, nonaglycerin, decaglycerin, and the like can be mentioned. A mixture of one kind or two or more kinds of them can be used as polyglycerin.

As a fatty acid as another constituting component of the polyglyceryl fatty acid ester (C), an unsaturated fatty acid can be used. That is, in the embodiment, the polyglyceryl fatty acid ester (C) is constructed in such a manner that at least one of hydroxyl groups of polyglycerin molecules is ester-bonded with the unsaturated fatty acid.

The unsaturated fatty acid is such a fatty acid that one or more unsaturated (double bond) carbon bonds are held in its structure. As an unsaturated fatty acid, an oleic acid, a linolenic acid, a palmitoleic acid, a gadoleic acid, an eicosadienic acid, an erucic acid, a docosadienic acid, and the like can be mentioned. Among them, the oleic acid is desirable and it is used as a mixture of one kind or two or more kinds of them. The unsaturated fatty acid may be either a fatty acid of a cis form or a fatty acid of a trans form.

By using the unsaturated fatty acid as a fatty acid of the polyglyceryl fatty acid ester (C), the bleed-out of the polyglyceryl fatty acid ester (C) as a dispersing agent of the inorganic filler can be suppressed. It is considered that such an effect appears by an interaction of a portion of the double bond of carbon of the unsaturated fatty acid of the polyglyceryl fatty acid ester (C) and a portion of the double bond of carbon of the thermoplastic resin (A).

Although the foregoing unsaturated fatty acid is an unsaturated fatty acid having no hydroxyl groups, an unsaturated fatty acid having a hydroxyl group is more desirable. That is, among the unsaturated fatty acids having one or more unsaturated carbon bonds (double bonds) in the structure of the fatty acid, one or both of a hydroxy fatty acid and a condensed hydroxy fatty acid are more desirable. The larger the number of unsaturated carbon bonds (double bonds) of the unsaturated fatty acid is, it is better. Therefore, the condensed hydroxy fatty acid serving as a fatty acid having a plurality of unsaturated carbon bonds is more desirable.

The condensed hydroxy fatty acid is a condensate of the hydroxy fatty acid. The hydroxy fatty acid is a fatty acid having one or more hydroxyl groups in a molecule. As specific examples of the hydroxy fatty acid of the unsaturated fatty acid, a ricinoleic acid, an ambrettolic acid, and the like can be mentioned. The ricinoleic acid is desirable and it is used as a mixture of one kind or two or more kinds of them. The hydroxy fatty acid is condensation-polymerized to a hydroxyl group of another hydroxy fatty acid by an ester bond, so that a plurality of unsaturated carbon bonds can be formed. An affinity with the thermoplastic resin (A) is further improved, and the bleed-out can be effectively suppressed. Since the unsaturated fatty acid has the hydroxyl group, a dispersibility of the inorganic filler (B) is also further improved.

Polyglyceryl condensed ricinoleic acid ester is more desirable as polyglyceryl fatty acid ester (C) which is used in the embodiment.

Although a fatty acid ester realization ratio of the polyglyceryl fatty acid ester (C) is not particularly limited, the larger the number of unsaturated carbon bonds (double bonds), it is better, and a ratio of 50% or more is desirable.

The polyglyceryl fatty acid ester (C) may be solely used or two or more of them may be used.

In this instance, the larger a molecular mass of polyglyceryl acid ester contained in the thermoplastic resin composition is, the more the bleed-out of the polyglyceryl acid ester can be suppressed. Therefore, although the molecular mass is small, it is better that the content percentage is low. Specifically speaking, as for molecular mass distribution of the polyglyceryl fatty acid ester (C), it is desirable that a content percentage of the molecules whose molecular mass is equal to 1000 or less is equal to 20% or less as a weight fraction and, more desirably, 10% or less.

It is desirable that a content percentage (content) of the polyglyceryl fatty acid ester (C) to the whole thermoplastic resin composition lies within a range between 0.5 wt % or more and 10 wt % or less. If it is less than 0.5 wt %, the effect of dispersing the inorganic filler (B), that is, the improvement effect of the impact resistance is low. On the other hand, if it exceeds 10 wt %, the suppression effect of the bleed-out of the polyglyceryl fatty acid ester (C) decreases.

In order to further improve the impact resistance, it is more desirable that the content percentage of the polyglyceryl fatty acid ester (C) to the whole thermoplastic resin composition is set to a value within a range between 1.5 wt % or more and 10 wt % or less. In addition, in order to further effectively suppress the bleed-out, it is more desirable that the content percentage of the polyglyceryl fatty acid ester (C) to the whole thermoplastic resin composition is set to a value within a range between 1.5 wt % or more and 5 wt % or less.

Consequently, such a thermoplastic resin composition that while keeping excellent strength, rigidity, and economy, it has an excellent impact resistance and it is difficult to cause a mold contamination at the time of molding is obtained.

As polyglyceryl fatty acid ester (C) constructed by the unsaturated fatty acid, for example, Tyrabazole H-818 made by Taiyo Kagaku Co., Ltd., Poem PR-300 or PR-100 made by Riken Vitamin Co., Ltd., and the like can be obtained.

[Other Additive Agents]

Additive agents can be added into the thermoplastic resin composition by an amount within a range in which the effects of the present invention are not deteriorated. As additive agents, for example, a conductive agent, an antioxidant, a heat stabilizer, a heat antiaging agent, a weathering agent, a plasticizer, a crystalline nucleus agent, a flowability improver, a compatibilizer, an ultraviolet ray absorbent, a lubricant, a mold releasing agent, a coloring agent such as dye, pigment, or the like, a flame retarder, and a flame resistance assistant agent can be mentioned. One or more kinds of normal additive agents can be added.

[Contacting Angle Measurement]

A contacting angle is an angle defined by a contacting portion of the surface of a resin molded article and a liquid droplet consisting of pure water and lies within a range of 0 to 180°. When the contacting angle is equal to 0°, a state where a water droplet is fully extended in a plane shape onto the surface of the resin molded article, that is, a state showing a hydrophilic property is obtained. When the contacting angle is equal to 180°, a state where the water is flipped off and is in contact, as a sphere, with the surface of the resin molded article is obtained. In other words, if the contacting angle is small, it can be decided that the hydrophilic property of the surface of the resin molded article is high. The polyglyceryl fatty acid ester has many hydroxyl groups in its structure and exhibits the hydrophilic property. Therefore, from the contacting angle of a water droplet at the time when the water droplet is dropped onto the surface of a specimen, a progress of the bleed-out of the polyglyceryl fatty acid ester onto the surface of the specimen can be discriminated.

[Weight Fraction of Molecular Mass of Polyglyceryl Fatty Acid Ester]

A molecular mass of the polyglyceryl fatty acid ester can be measured by a gel permeation chromatography (GPC). A solvent can be measured by a method whereby it is dissolved into tetrahydrofuran (THF) and a resultant material is measured and is polystyrene (PS) converted. A weight fraction of the molecular mass can be obtained by calculating a ratio (%) of an area of a region on a molecular mass distribution curve which is derived from the GPC measurement result.

[Kneading and Molding]

The thermoplastic resin composition of the embodiment can be manufactured by mixing by a mixer such as tumbler, V-type blender, Nauta mixer, Banbury mixer, kneading roll, extruder, or the like. Particularly, the melt-kneading by the extruder is desirable. Further, in the melt-kneading, the thermoplastic resin (A), inorganic filler (B), polyglyceryl fatty acid ester (C), and other components constructing the thermoplastic resin composition can be preliminarily mixed or kneaded. It is desirable that the thermoplastic resin (A) and the polyglyceryl fatty acid ester (C) are preliminarily processed by a dry method of executing a surface treatment by using an agitator such as Henschel mixer, ball mill, atomizer colloid mill, or Banbury mixer. Or, it is desirable to execute a pre-treatment by a wet method whereby the thermoplastic resin (A) is added into the solvent and, after they were stirred and mixed, the solvent is removed. Particularly, it is desirable to execute the pre-treatment by the dry method. By using the thermoplastic resin composition obtained by the foregoing manufacturing method, a molded article can be easily molded by a method such as extrusion molding, injection molding, compression molding, or the like by using the thermoplastic resin composition obtained by the foregoing manufacturing method. It can be also applied to a blow molding, a vacuum molding, a dichroic molding, or the like. That is, it can be applied to various kinds of manufacturing methods of manufacturing the molded article by molding the thermoplastic resin composition by using a metal mold.

EXAMPLES

Although the present invention will be specifically described hereinbelow with respect to Examples, the invention is not limited to such Examples. Raw materials used in common in Examples are as follows.

Thermoplastic resin (A): NORYL N802 made by Sabic Co., Ltd.
Inorganic filler (B): NS#100 made by Nitto Funka Industries Co., Ltd., mean particle diameter: 2.1 μm
Polyglyceryl fatty acid ester (C):
(C-1) Tyrabazole H-818 (polyglyceryl ricinolate) made by Taiyo Kagaku Co., Ltd.
(C-2) Poem J-0021 (polyglyceryl laurate) made by Riken Vitamin Co., Ltd.

The thermoplastic resin (A) is a high impact polystyrene (a rubber-like elastic body is a butadiene rubber). The inorganic filler (B) is a calcium carbonate.

The polyglyceryl fatty acid ester (C-1) relates to relevant Example and is polyglyceryl condensed ricinoleic acid ester in which a fatty acid is an unsaturated fatty acid. That is, a condensate in which ricinoleic acids are mutually ester-bonded is used as an unsaturated fatty acid. The polyglyceryl fatty acid ester (C-2) relates to Comparison and the fatty acid is a saturated fatty acid.

(Manufacturing of Specimen)

The thermoplastic resin (A) and the polyglyceryl fatty acid ester (C) shown in Table 1 are blended by using a tumbler mixer (TMS-36S made by Seiwa Giken Co., Ltd.), the inorganic filler (B) is further added, and a blend body consisting of uniform raw materials is preliminarily formed. The blend body is melt-kneaded at a cylinder temperature of 200° C. by a biaxial kneading extruder (PCM30 made by Ikegai Co., Ltd.), and a pellet of the thermoplastic resin composition is obtained by using a strand cutter. The obtained pellet is injection molded at the cylinder temperature of 200° C. and a metal mold temperature of 50° C. by using an injection molding machine (SE-180D made by Sumitomo Heavy Industries, Ltd.), and a strip-shaped specimen Type B1 (length 80 mm×width 10 mm×thickness 4 mm) specified by JIS K7152-1 is formed. With respect to such a specimen, a contacting angle is measured by the following measuring method, and a mold contamination and an impact resistance test are performed. Results of them are shown in Table 1.

(Contacting Angle)

A contacting angle is measured by using the molded strip-shaped specimen. The contacting angle is measured by a liquid-drop method by using an automatic contacting angle measuring apparatus (Drop Master 500 made by Kyowa Kaimen Kagaku Co., Ltd.). A drop liquid is pure water, a liquid amount is set to 1.2 μL, and the contacting angle after the liquid was dropped for 1000 msec is calculated by a θ/2 method. Results are shown in Table 1.

(Metal Mold Contamination)

A metal mold which can mold the strip-shaped specimen (length 80 mm×width 10 mm×thickness 4 mm) is attached by using an injection molding machine (SE-180D made by Sumitomo Heavy Industries, Ltd.), a cylinder temperature of the molding machine is set to 200° C., a metal mold temperature is set to 50° C., and the molding is executed. After 30 shots were continuously molded, an inside and a periphery of a metal mold cavity are observed by the eyes and a situation of the mold contamination is evaluated by the following barometers. Results are shown in Table 1.

○: No deposit is confirmed on the metal mold surface and no mold contamination is found.

x: A deposit is confirmed on the metal mold surface and a metal mold contamination occurs.

Δ: A slight deposit is conformed on the metal mold surface and a slight mold contamination occurs.

(Impact Resistance)

The molded strip-shaped specimen is notch (shape A) processed by using a notch finishing machine (made by Yasuda Seiki Co., Ltd.) in accordance with JIS K7111. A Charpy impact test is performed to the specimen by using a digital Charpy impact testing machine (Hammer 0.5J made by Yasuda Seiki Co., Ltd.) in accordance with JIS K7111-1. Results of the Charpy impact test which were measured are evaluated by the following barometers. Results are shown in Table 1.

○: A measurement value of the Charpy impact test is equal to 1.8 kJ/m² or more.

x: A measurement value of the Charpy impact test is less than 1.8 kJ/m².

TABLE 1

|  |  |  | Example 1 | Example 2 | Example 3 | Example 4 | Example 5 | Example 6 | Comparison 1 | Comparison 2 |
|---|---|---|---|---|---|---|---|---|---|---|
|  | (A) [wt %] |  | 58.5 | 55 | 50 | 40 | 79.5 | 48 | 60 | 58.5 |
|  | (B) [wt %] |  | 40 | 40 | 40 | 50 | 20 | 40 | 40 | 40 |
| (C) | <C-1> [wt %] |  | 1.5 | 5 | 10 | 10 | 0.5 | 12 |  |  |
|  | <C-2> [wt %] |  |  |  |  |  |  |  |  | 1.5 |
|  | Contacting angle [°] |  | 87.1 | 84.5 | 56 | 75.8 | 82.7 | 48.9 | 85.7 | 72.2 |
|  | Metal mold contamination |  | ○ | ○ | ○ | ○ | ○ | Δ | ○ | ○ |
| Impact resistance | Evaluation |  | ○ | ○ | ○ | ○ | ○ | ○ | x | x |
|  | Measurement value [kg/m²] |  | 1.9 | 2.17 | 2.3 | 1.9 | 1.81 | 1.82 | 0.99 | 1.47 |

|  |  |  | Comparison 3 | Comparison 4 | Comparison 5 | Comparison 6 |
|---|---|---|---|---|---|---|
|  | (A) [wt %] |  | 55 | 50 | 40 | 79.5 |
|  | (B) [wt %] |  | 40 | 40 | 50 | 20 |
| (C) | <C-1> [wt %] |  |  |  |  |  |
|  | <C-2> [wt %] |  | 5 | 10 | 10 | 0.5 |
|  | Contacting angle [°] |  | 16.8 | 17.5 | 22.8 | 82.5 |
|  | Metal mold contamination |  | x | — | — | ○ |
| Impact resistance | Evaluation |  | x | — | — | x |
|  | Measurement value [kg/m²] |  | 1.42 | Molding is impossible | Molding is impossible | 1.64 |

Contacting angles of the molded articles of the resin compositions of Examples 1 to 5 into which the polyglyceryl fatty acid ester (C-1) was added exhibit large values as compared with those of the molded articles of the resin compositions of Comparisons 2 to 6 into which the polyglyceryl fatty acid ester (C-2) of the same amount was added. Particularly, in Comparison 3, a mold contamination is confirmed by the eyes.

A contacting angle of the molded article of the resin composition of Example 6 into which the polyglyceryl fatty acid ester (C-1) of an amount over 10 wt % was added exhibits a small value as compared with contacting angles of the molded articles of the resin compositions of Examples 1 to 5 into which the polyglyceryl fatty acid ester (C-1) of an amount which is equal to 10 wt % or less was added. However, a mold contamination thereof is slight and causes no substantial adverse effect in comparison with the mold contamination of the polyglyceryl fatty acid ester (C-2) of 5 wt % according to the Comparison 2.

Impact values (Charpy impact values) showing the impact resistance of the molded articles of the resin compositions of Examples 1 to 3 are higher than those of the molded articles of the resin compositions of Comparisons 1 to 3, and it can be confirmed that the impact resistance is improved. In Comparison 4, a gas is generated at the time of injection molding, so that a specimen for measurement of an impact resistance is not molded and a mold contamination is not observed.

From the results of Table 1 mentioned above, it can be confirmed that if the polyglyceryl fatty acid ester (C-1) of Examples is used, both of the impact resistance and the mold contamination are improved as compared with the case of using the polyglyceryl fatty acid ester (C-2) of Comparisons.

The thermoplastic resin composition obtained by the foregoing manufacturing steps can be easily molded by the molding method such as extrusion molding, injection molding, compression molding, or the like which is generally used, and can be also applied to a blow molding, a vacuum molding, a dichroic molding, and the like. For example, in the case of the injection molding, a molded article is manufactured by injecting a resin into a metal mold 52 from an injection molding machine 51 as illustrated in FIGURE. The molded articles are applied as parts of OA equipment or other electric/electronic equipment or parts of attachments of electric/electronic equipment. The molded articles can be also applied to structural members of automobiles, airplanes, or the like, building members, food containers, and the like. That is, the molded articles can be applied to various kinds of manufacturing methods of manufacturing molded articles by molding the thermoplastic resin composition by using the metal mold.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-093456, filed May 6, 2016, and Japanese Patent Application No. 2017-079089, filed Apr. 12, 2017, which are hereby incorporated by reference herein in their entirety.

What is claimed is:

1. A thermoplastic resin composition comprising:
a thermoplastic resin;
a filler; and
polyglyceryl fatty acid ester,
wherein the thermoplastic resin contains a component of formula (I):

$$-CH_2-CH=CH-CH_2- \quad (I),$$ 

wherein a fatty acid constructing the polyglyceryl fatty acid ester is an unsaturated fatty acid,
wherein a content of the thermoplastic resin is 40 wt % to 79.5 wt %, a content of the filler is 20 wt % to 50 wt %, and a content of the polyglyceryl fatty acid ester is 0.5 wt % to 12 wt %,
wherein a content of the component of the formula (I) with respect to the entire thermoplastic resin is 2 wt % to 30 wt %, and
wherein the unsaturated fatty acid is a hydroxy fatty acid and/or a condensate of the hydroxy fatty acid.

2. The composition according to claim 1, wherein the thermoplastic resin is a high impact polystyrene.

3. The composition according to claim 1, wherein the hydroxy fatty acid is ricinoleic acid.

4. The composition according to claim 1, wherein a content percentage of molecules whose molecular mass is equal to 1000 or less in the polyglyceryl fatty acid ester is equal to 20% or less as a weight fraction.

5. The composition according to claim 1, wherein the filler is calcium carbonate.

6. A molded article comprising a thermoplastic resin composition comprising:
a thermoplastic resin;
a filler; and
polyglyceryl fatty acid ester,
wherein the thermoplastic resin contains a component of formula (I):

—CH$_2$—CH=CH—CH$_2$— (I), wherein a fatty acid constructing the polyglyceryl fatty acid ester is an unsaturated fatty acid,
wherein a content of the thermoplastic resin is 40 wt % to 79.5 wt %, a content of the filler is 20 wt % to 50 wt %, and a content of the polyglyceryl fatty acid ester is 0.5 wt % to 12 wt %,
wherein a content of the component of the formula (I) with respect to the entire thermoplastic resin is 2 wt % to 30 wt %, and
wherein the unsaturated fatty acid is a hydroxy fatty acid and/or a condensate of the hydroxy fatty acid.

7. A thermoplastic resin composition comprising:
a thermoplastic resin;
a filler; and
polyglyceryl fatty acid ester,
wherein the thermoplastic resin contains a component of formula (I):

—CH$_2$—CH=CH—CH$_2$— (I), wherein a fatty acid constructing the polyglyceryl fatty acid ester is an unsaturated fatty acid,
wherein a content of the thermoplastic resin is 40 wt % to 79.5 wt %, a content of the filler is 20 wt % to 50 wt %, and a content of the polyglyceryl fatty acid ester is 0.5 wt % to 12 wt %,
wherein the thermoplastic resin is a high impact polystyrene, and
wherein the unsaturated fatty acid is a hydroxy fatty acid and/or a condensate of the hydroxy fatty acid.

8. The composition according to claim 7, wherein a content of the component of the formula (I) with respect to the entire thermoplastic resin is 2 wt % to 30 wt %.

9. The composition according to claim 7, wherein the hydroxy fatty acid is ricinoleic acid.

10. The composition according to claim 7, wherein a content percentage of molecules whose molecular mass is equal to 1000 or less in the polyglyceryl fatty acid ester is equal to 20% or less as a weight fraction.

11. The composition according to claim 7, wherein the filler is calcium carbonate.

12. A molded article comprising a thermoplastic resin composition comprising:
a thermoplastic resin;
a filler; and
polyglyceryl fatty acid ester,
wherein the thermoplastic resin contains a component of formula (I):

—CH$_2$—CH=CH—CH$_2$— (I), wherein a fatty acid constructing the polyglyceryl fatty acid ester is an unsaturated fatty acid,
wherein a content of the thermoplastic resin is 40 wt % to 79.5 wt %, a content of the filler is 20 wt % to 50 wt %, and a content of the polyglyceryl fatty acid ester is 0.5 wt % to 12 wt %,
wherein the thermoplastic resin is a high impact polystyrene, and
wherein the unsaturated fatty acid is a hydroxy fatty acid and/or a condensate of the hydroxy fatty acid.

13. The article according to claim 12, wherein a content of the component of the formula (I) with respect to the entire thermoplastic resin is 2 wt % to 30 wt %.

14. The article according to claim 12, wherein the hydroxy fatty acid is ricinoleic acid.

15. The article according to claim 12, wherein a content percentage of molecules whose molecular mass is equal to 1000 or less in the polyglyceryl fatty acid ester is equal to 20% or less as a weight fraction.

16. The article according to claim 12, wherein the filler is calcium carbonate.

* * * * *